US009719623B2

(12) United States Patent
Chakkalakal

(10) Patent No.: US 9,719,623 B2
(45) Date of Patent: Aug. 1, 2017

(54) HEAT TRACE SYSTEM INCLUDING HYBRID COMPOSITE INSULATION

(75) Inventor: Franco Chakkalakal, Manvel, TX (US)

(73) Assignee: Pentair Thermal Managment LLC, Redwood City, CA (US)

( * ) Notice: Subject to any disclaimer, the term of this patent is extended or adjusted under 35 U.S.C. 154(b) by 223 days.

(21) Appl. No.: 13/822,069

(22) PCT Filed: Sep. 15, 2011

(86) PCT No.: PCT/US2011/051799
§ 371 (c)(1),
(2), (4) Date: May 28, 2013

(87) PCT Pub. No.: WO2012/037374
PCT Pub. Date: Mar. 22, 2012

(65) Prior Publication Data
US 2013/0248013 A1    Sep. 26, 2013

Related U.S. Application Data

(60) Provisional application No. 61/383,258, filed on Sep. 15, 2010.

(51) Int. Cl.
*F16L 53/00*   (2006.01)
*F16L 59/02*   (2006.01)

(52) U.S. Cl.
CPC .......... *F16L 53/001* (2013.01); *F16L 53/002* (2013.01); *F16L 53/005* (2013.01); *F16L 53/008* (2013.01); *F16L 59/029* (2013.01); *Y10T 137/6416* (2015.04)

(58) Field of Classification Search
CPC ............................ F16L 53/005; F16L 53/008
See application file for complete search history.

(56) References Cited

U.S. PATENT DOCUMENTS

| 3,151,633 | A |   | 10/1964 | Shuman |
| 3,768,523 | A | * | 10/1973 | Schroeder ..................... 138/141 |
| 5,192,039 | A |   | 3/1993  | Williams |
| 5,934,337 | A | * | 8/1999  | Fiala et al. .................... 138/149 |
| 6,092,557 | A |   | 7/2000  | Sumner |
| 7,260,320 | B2 | * | 8/2007 | Stanzel et al. ................ 392/468 |
| 7,581,565 | B1 | * | 9/2009 | Torrance et al. ............. 138/110 |
| 2009/0205737 | A1 |   | 8/2009 | Dinon et al. |
| 2009/0217999 | A1 | * | 9/2009 | Becker ............................ 138/33 |
| 2009/0220223 | A1 |   | 9/2009 | Colosimo |
| 2009/0293350 | A1 |   | 12/2009 | Kania |
| 2010/0034593 | A1 |   | 2/2010 | Strong |

* cited by examiner

*Primary Examiner* — Kevin Murphy
(74) *Attorney, Agent, or Firm* — Quarles & Brady LLP

(57) ABSTRACT

A fluid pipeline has a first end and a second end. An elongated heat trace element comprised of first and second heat tubes is aligned and coupled to at least a portion of an outer surface of the fluid pipeline. The outer surface of fluid pipeline carries a first insulation material covering a first portion of the outer surface. The outer surface of the fluid pipeline further carries a second insulation material covering a second portion of the outer surface and wherein the second portion of the outer surface is different than the first portion of the outer surface. The first and second insulation materials are configured to cover the outer surface of the fluid pipeline. The fluid pipeline further comprises a third insulation material carried over a second outer surface defined by the cooperation of the first and second insulation materials.

13 Claims, 5 Drawing Sheets

B. Comb of Perlite, MW and Foam
Temperature
Type: Temperature
Unit: °C
Time: 1

B. Comb of Perlite, MW and Foam
Temperature 2
Type: Temperature
Unit: °C
Time: 1

HEAT TRACE SYSTEM INCLUDING HYBRID COMPOSITE INSULATION

CROSS REFERENCE TO RELATED APPLICATIONS

This application claims priority on U.S. Provisional Patent Application No. 61/383,258, filed Sep. 15, 2010, which is incorporated herein by reference.

BACKGROUND OF THE INVENTION

1. Field of the Invention

The present invention generally relates to heated fluid pipelines. More specifically, the present invention pertains to heated fluid pipelines that incorporate a hybrid insulation configuration.

2. Description of the Background Art

External thermal insulation is frequently an important component of heated pipelines including, without limitation, sulfur transportation pipelines. Generally, such thermal insulation is applied to provide adequate heat preservation and personnel protection for above-ground pipelines. Existing fluid transportation pipelines such as liquid sulfur transportation pipelines and/or piping systems often utilize high temperature insulation materials including, without limitation, the following: (1) aero gel insulation; (2) perlite insulation; (3) mineral wool; and (4) polyurethane insulation.

Aero gel insulation advantageously provides low thermal conductivity relative to commonly available high temperature insulations. Moreover, aero gel insulation is flexible and is easy to apply to pipelines. Because aero gel insulation provides low thermal conductivity, a thin layer of insulation may be utilized to coat and insulate a pipeline. Aero gel is typically expensive which makes it economically uncompetitive with other known insulation alternatives.

Perlite is another known insulation material. Perlite insulation is an inexpensive and proven insulation material with high compressive strength and high temperature capability. Perlite is fragile and may be damaged in transportation and installation. Perlite typically provides a low insulation value requiring additional thickness/material to achieve a desired heat profile.

Mineral wool is yet another known insulation material. Mineral wool is an economical insulation material used for high temperature applications. Mineral wool frequently provides better insulation value than perlite without high compressive strength to support a pipeline.

Polyurethane, another known insulation material, provides low thermal conductivity. Generally, polyurethane's insulation performance is exceeded only by aero gel insulation. Polyurethane insulation typically operates and/or insulates temperatures around 150° C. However, polyurethane insulation typically cannot directly withstand high temperatures such as those experienced in sulfur transportation lines.

It would be desirable to provide a system that addresses the limitations of conventional insulation materials while maximizing the advantages afforded by each of these insulation materials.

SUMMARY OF THE INVENTION

The disclosed heat trace system including hybrid composite insulation of the present invention includes a fluid pipeline having a first end and a second end. An elongated heat trace element is aligned and coupled to at least a portion of an outer surface of the fluid pipeline.

Pipeline heat tracing systems are well known to those having skill in the art. Such pipeline heat tracing systems generally comprise at least one heat release element (such as, for example heat tubes) strapped or welded to a carrier pipe. To produce higher temperatures, multiple tubes can be continuously welded to such carrier pipe. In most cases, such weld is "non-structural" and strictly required as a heat transfer vehicle from the heat release element(s) to the carrier pipe. Although the precise mechanisms and configurations can vary, heat tubes can contain heating element(s) used to generate heat.

Additionally, at least one fiber optic line can also be provided for various control and/or monitoring functions. For example, said at least one fiber optic line can be utilized to continuously monitor a pipeline's temperature profile across substantially its entire length, thereby ensuring the safe and reliable performance of the systems.

The outer surface of the fluid pipeline carries a first insulation material, wherein said first insulation covers a first portion of the outer surface of said pipeline. The outer surface of fluid pipeline further carries a second insulation material, wherein the second insulation covers a second portion of the outer surface and wherein the second portion of the outer surface is different than the first portion of the outer surface. The first and second insulation materials are configured to cooperate and cover the outer surface of the fluid pipeline. The fluid pipeline further comprises a third insulation material carried over a second outer surface defined by the cooperation of the first and second insulation materials.

Other embodiments are disclosed, and each of the embodiments can be used alone or together in combination. Additional features and advantages of the disclosed embodiments are described in, and will be apparent from, the following Detailed Description and the drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed. Further, dimensions, materials and part names are provided for illustration purposes only and not limitation.

DETAILED DESCRIPTION OF A PREFERRED EMBODIMENT OF THE INVENTION

The heat trace system of the present invention disclosed herein includes pipeline assembly 100 configured with a hybrid composite insulation system with skin effect heat generation disposed about an outer surface.

Figure 1:
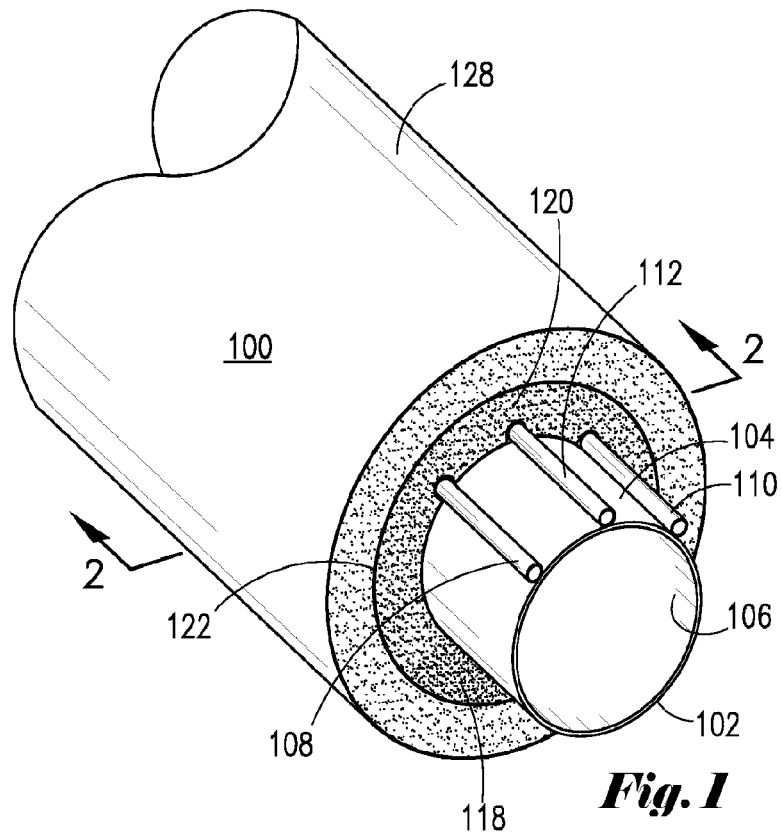
FIG. 1 depicts a perspective view of an exemplary hybrid fluid pipeline insulation configured according to the present invention.

FIG. 1 depicts a perspective view of an exemplary hybrid fluid pipeline insulation configured according to the present invention. Pipeline assembly 100 comprises pipeline 102, which may be a substantially cylindrical length of pipe having an outer surface 104 and a substantially hollow interior 106. It is to be observed that pipeline 102 can be used for any number of functions including, without limitation, for the transportation of fluids along hollow interior 106 of said pipeline 102.

Pipeline 102 includes a heat trace element preferably comprised of first heat tube 108 and second heat tube 110. Said heat tubes 108 and 110 can be heat tubes used to supply heat according to methods known to those having skill in the art. If desired, it is to be observed that the placement of said heat tubes 108 and 110 may be varied relative to pipeline 102 in order to accommodate particular installations or design parameters. Pipeline 102 may further support a fiber optic cable encasement tube 112 fixedly attached to the outer surface 104 of pipeline 102 generally between heat tubes 108 and 110. Said fiber optic cable encasement tube 112 can be used according to methods known to those having skill in the art.

Still referring to FIG. 1, a first rigid insulation 118 having high temperature and load bearing capabilities may be beneficially disposed around a portion of pipeline 102. A second insulation material 120 can be disposed around another portion of pipeline 102, as more fully described below. Said second insulation material 120 may include—pre-formed grooves adapted to cooperate with first and second heat pipes 108, 110 and fiber optic cable encasement tube 112. A metallic interface wrap 122 may cover or encase first insulation material 118 and second insulation material 120, and separate said first and second insulations 118 and 120, respectively, from outer insulation layer 126. A high-density polyethylene (HDPE) vapor barrier 128 may be wrapped or otherwise disposed around outer layer 126 of pipeline 102.

Figure 2:
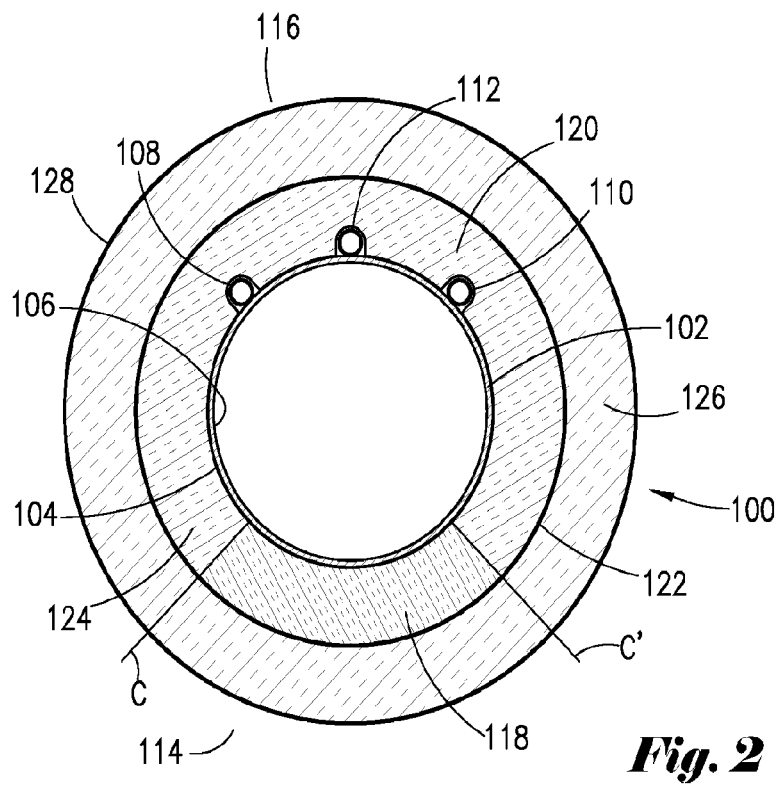
FIG. 2 depicts a cross-sectional view of an exemplary hybrid fluid pipeline insulation configured according to the present invention.
Figure 3:
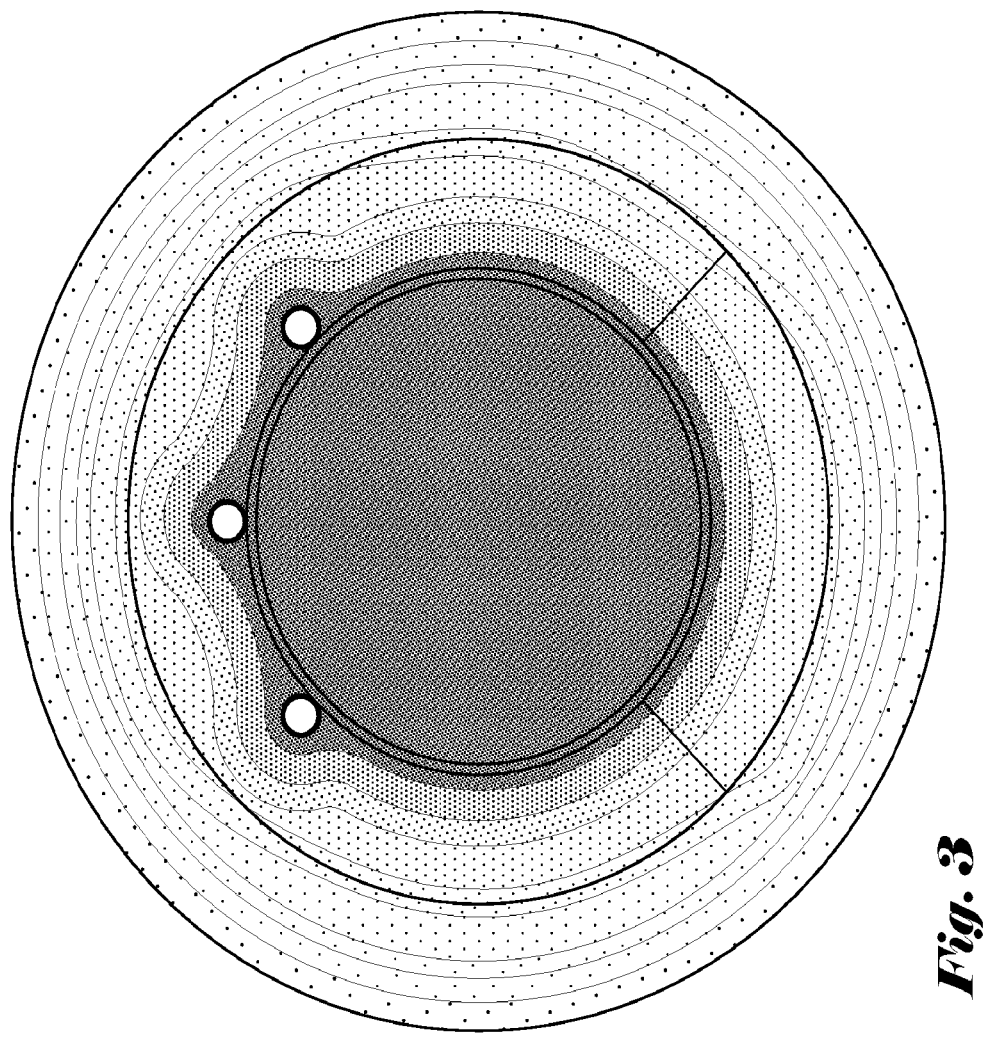
FIGS. 3 to 6 illustrate thermal analyses of elements of the exemplary hybrid fluid pipeline insulation of the present invention.
Figure 3:
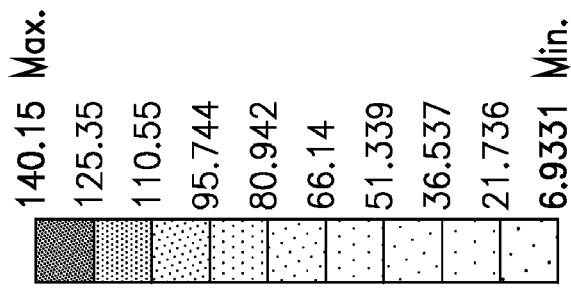
Figure 4:
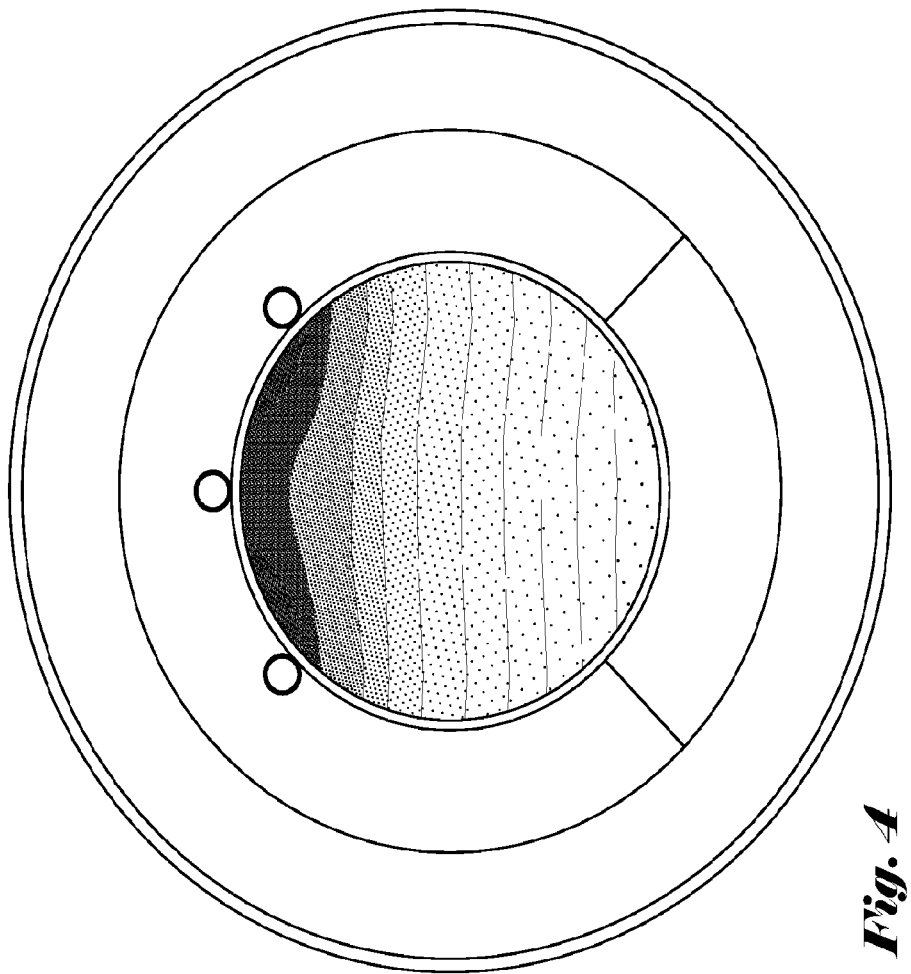
Figure 4:
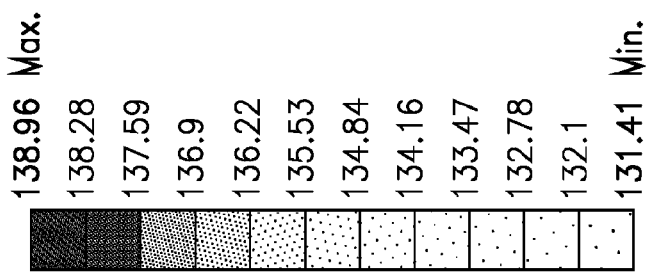
Figure 5:
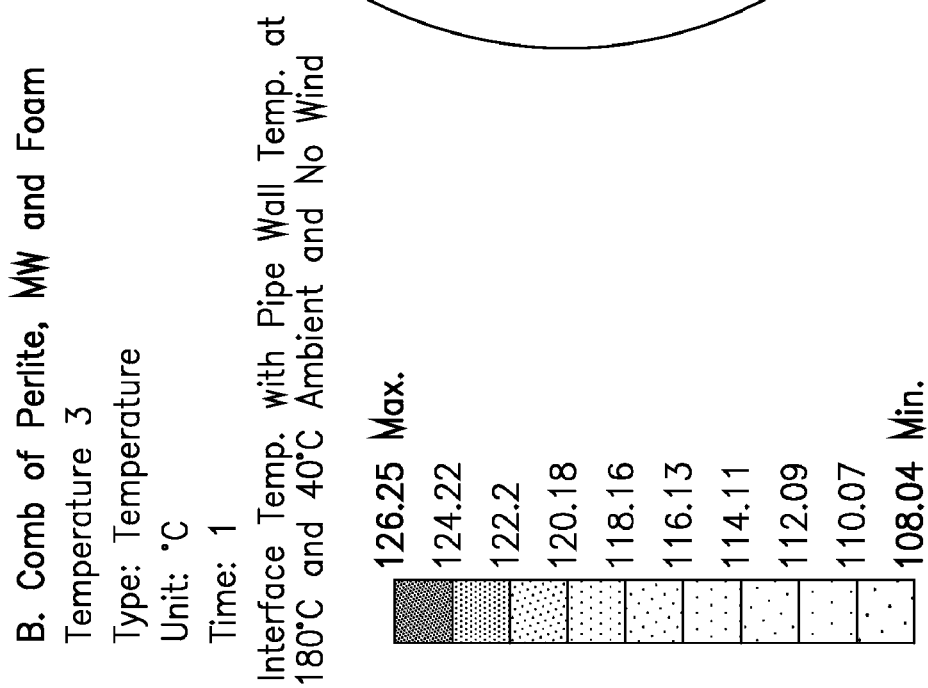
Figure 6:
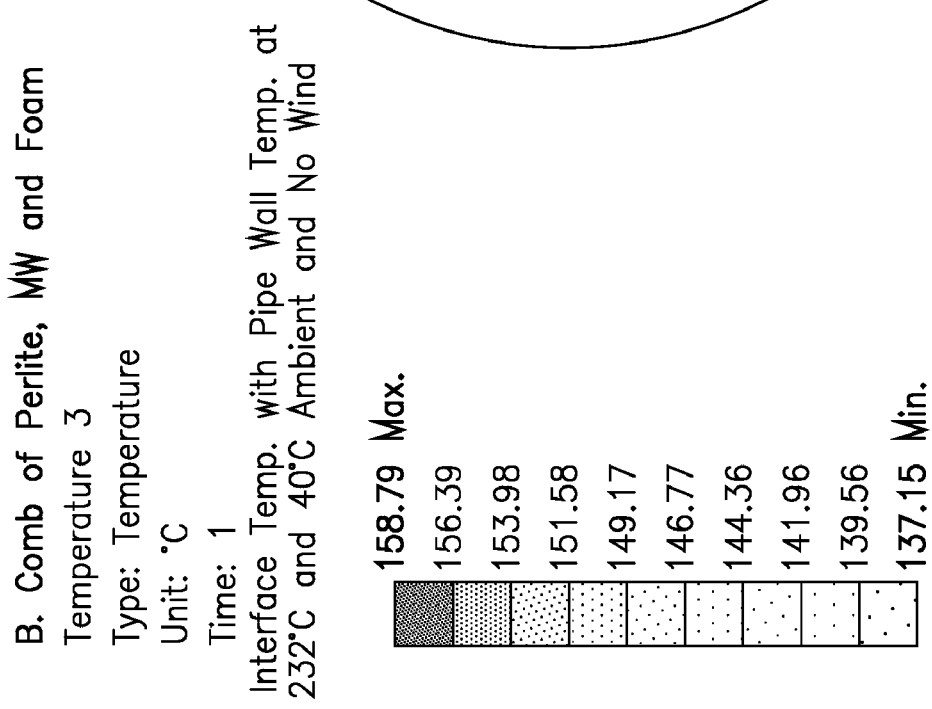

FIG. 2 depicts a cross-section view of an exemplary embodiment of the pipeline 102 and hybrid composite insulation system 100. Pipeline 102 may be a substantially cylindrical pipe having an outer surface 104 and a substantially hollow interior 106. By way of illustration, but not limitation, it is to be observed that pipeline 102 may be an A106 Grade B carbon steel pipe configured to transport molten sulfur along hollow interior 106 of said pipeline 102.

Pipeline 102 may include a first heat tube 108. As depicted in FIG. 2, heat tube 108 is disposed at approximately the "10:30" position. Pipeline 102 may further include a second heat tube 110, shown in FIG. 2 as being disposed at approximately the "1:30" position. Said first and second heat tubes 108 and 110 may include, for example, an A106 Grade B carbon steel sheath for protection. In this manner, said first and second heat tubes 108, 110 may be welded or otherwise affixed to outer surface 104 of pipeline 102. Pipeline 102 may further support a fiber optic cable encasement tube 112 fixedly attached to the outer surface 104 of pipeline 102 at approximately the "12:00" o'clock position. As used herein, such position references of "10:30", "1:30" and "12:00 o'clock" denote general positions relative to pipeline 102, as relates to a standard clock dial, with 12 o'clock considered as the central vertical location on said pipeline 102.

Outer surface 104 of pipeline 102 may include a first peripheral portion 114 defined between radial line C and radial line C', inclusive. Outer surface 104 of pipeline 102 may further include a second peripheral portion 116 defined between the radial line C and radial line C', exclusive. In other words, in the embodiment depicted in FIG. 2, said first peripheral portion 114 may be the bottom (relative to the position of the heat tubes 108 and 110) quadrant. Said first peripheral portion 114 may carry a first rigid insulation 118 having high temperature and load bearing capabilities. By way of example, but not limitation, said rigid insulation may be configured to resist pipe temperatures in excess of 235° C. Examples of suitable rigid insulation may include, without limitation, expanded perlite/high-density calcium silicate/HITLIN™.

Second peripheral portion 116 (i.e., the remaining outer surface 104 of the pipeline 102 in the exemplary embodiment depicted in FIG. 2) may be encased or covered in a second insulation material 120. The second insulation material 120 may be a high temperature flexible and high-density insulation material such as a high density rockwool thermal insulation with, for example, factory molded grooves adapted to cooperate with first and second heat pipes 108, 110 and the fiber optic cable encasement tube 112.

A metallic interface wrap 122 may cover or encase an outer surface of first and second peripheral portions 114, 116. Said metallic interface wrap 122 can beneficially distribute heat around the circumference of the pipeline 102. The combination of first insulation 118 and second insulation 120 define a first insulation layer 124. In a preferred embodiment, metallic interface wrap 122 encompasses the first insulation layer 124 and separates it from the second or outer insulation layer 126.

The second or outer layer 126 may be a high temperature polyurethane foam (PUF) insulation of sufficient thickness and density to reduce the heat loss along pipeline 102 while providing sufficient compressive strength to support the weight of a filled sulfur pipeline. In one embodiment, said polyurethane foam may be applied by "controlled spraying technique" to result in concentric insulation, although it is to be observed that other application methods may also be utilized. Additionally, a high-density polyethylene (HDPE) vapor barrier 128 may be wrapped or otherwise disposed around the second or outer layer 126 of the pipeline 102.

FIGS. 3 through 6 illustrate graphical representations of thermal analyses of elements of the exemplary hybrid fluid pipeline insulation system of the present invention. In particular, each of the figures is a finite element analysis image representative of the thermal considerations and/or effects that may be experienced by pipeline 102. For example, each layer of the thermal insulation may be selected or utilized to create a homogenous heat loss through said insulation. Information determined from the finite element analysis images of FIGS. 3 through 6 may be utilized to prevent a differential heat loss through the insulation layers encompassing pipeline 102 resulting in non-uniform temperature at the interface between the inner layer and outer layer.

The finite element analysis images of FIGS. 3 through 6 may be utilized to analyze and/or determine the thickness of the dual materials comprising the inner or first layer of insulation. Each of the dual materials of the first layer has a different k-value and a different compressibility with respect to the other material making the selection of the individual materials important. Moreover, controlling the temperature at the interface of the inner or first layer, and the outer or second layer, can be significant because the temperature rating of the outer layer or foam is lower than the potential temperature that may be experienced at said interface. Exposing the outer or second layer of insulation to higher temperature can frequently result in a degradation or compromise the service life of the foam insulation and eventually result in unacceptable heat loss. As such, the hybrid insulation material configuration disclosed herein may be selected and applied to pipeline 102 to prevent unwanted temperature conditions.

In one embodiment of the present invention, pipeline 102 may be rotatably supported to allow insulation material to be targeted and applied to the outer surface of the pipeline 102 in desirable locations, quantities and thicknesses. For example, a section of the pipeline 102 may be supported at each end and rotated along an axial centerline. One or more spray nozzles may be utilized, under computer and/or analysis control, to apply insulation material at precise locations and configurations. The embodiments disclosed herein provide a cost-effective thermally insulated skin effect heating system that offers a safe and reliable re-melt of fluids contained in a pipeline (including, without limitation, sulfur) carried in a pipeline, such as pipeline 102, by applying concentrated heat at a desired portion of the pipe to create a melted stream of sulfur. The melted stream of sulfur or "rat hole" extends along the length of the pipeline 102 adjacent to the first and second heat tubes 108 and 110. The rat hole allows the melted sulfur to flow into empty sections of the pipeline 102 while eliminating the possibility of over-heating the sulfur pipeline 102. The hybrid composite insulation further prevents the possibility of air gaps associated with the "grooved" hard insulation while offering required compressive strength at the bottom portion of the pipe.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

The invention claimed is:

1. A hybrid insulation system comprising:
   a) a pipeline having an outer surface defining a circumference of the pipeline and carrying at least one heating element, the pipeline having a hollow interior configured to fluidly carry a material;
   b) a first insulation layer, the first insulation layer comprising:
      i) a first insulation portion carried along the outer surface of the pipeline within a first peripheral portion of the circumference measured from a first point on the circumference to a second point on the circumference, the first peripheral portion including a third point on the circumference that is arranged substantially opposite from the at least one heating element, the first insulation portion constructed of a first insulating material, the first insulating material being a rigid insulation; and
      ii) a second insulation portion carried along the outer surface of the pipeline within a second peripheral portion of the circumference measured from the first point to the second point and disposed substantially opposite the first peripheral portion, the second insulation portion constructed of a second insulating material, the second insulating material being a flexible insulation that is less rigid than the rigid insulation of the first insulating material, wherein the second insulating material is a separate and distinct material from the first insulating material; and
   c) a second insulation layer, the second insulation layer encompassing the first insulation layer and configured to extend along the outer surface of the pipeline.

2. The hybrid insulation system of claim 1 further comprising a metallic interface wrap enclosing the first insulation layer.

3. The hybrid insulation system of claim 1 further comprising a vapor barrier enclosing the second insulation layer.

4. The hybrid insulation system of claim 3, wherein the vapor barrier is a high-density polyethylene (HDPE) vapor barrier.

5. The hybrid insulation system of claim 1, wherein the pipeline is a carbon steel pipe.

6. The hybrid insulation system of claim 1 further comprising a fiber optic tube carried substantially adjacent to the at least one heating element.

7. The hybrid insulation system of claim 1, wherein the first insulating material is an expanded perlite thermal insulation.

8. The hybrid insulation system of claim 1, wherein the second insulating material is a high density rockwool thermal insulation.

9. The hybrid insulation system of claim 1, wherein the second insulation layer is a polyurethane foam (PUF).

10. The hybrid insulation system of claim 9, wherein the polyurethane foam is applied using a controlled spraying technique.

11. The hybrid insulation system of claim 1, wherein the second insulation portion includes a plurality of pre-formed grooves.

12. The hybrid insulation system of claim 11, wherein at least one of the plurality of pre-formed grooves is adapted to cooperate with a heat pipe.

13. The hybrid insulation system of claim 11, wherein one of the plurality of pre-formed grooves is adapted to cooperate with a fiber optic cable encasement tube.

* * * * *